United States Patent
Nishimura et al.

(10) Patent No.: US 6,632,567 B2
(45) Date of Patent: Oct. 14, 2003

(54) NICKEL-METAL HYDRIDE STORAGE BATTERY

(75) Inventors: Koichi Nishimura, Osaka (JP); Mutsumi Yano, Osaka (JP); Hiroshi Nakamura, Osaka (JP); Kazuki Hamasaki, Osaka (JP); Mitsunori Tokuda, Osaka (JP); Yasuhiko Itoh, Kyoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 231 days.

(21) Appl. No.: 09/814,874

(22) Filed: Mar. 23, 2001

(65) Prior Publication Data

US 2001/0033965 A1 Oct. 25, 2001

(30) Foreign Application Priority Data

Mar. 23, 2000 (JP) ........................... 2000-081535

(51) Int. Cl.$^7$ ................................. H01M 4/58
(52) U.S. Cl. ................. 429/218.2; 429/218.1; 429/223
(58) Field of Search ............ 429/218.1, 218.2, 429/223

(56) References Cited

U.S. PATENT DOCUMENTS

| | | |
|---|---|---|
| 4,551,400 A | 11/1985 | Sapru et al. |
| 4,849,205 A | 7/1989 | Hong |
| 6,132,639 A | * 10/2000 | Komatsu et al. ......... 252/182.1 |

FOREIGN PATENT DOCUMENTS

| | | | |
|---|---|---|---|
| EP | 0652601 A1 | 5/1995 | |
| JP | a521064 | 1/1993 | |
| JP | A6228699 | 8/1994 | |
| JP | 7-268513 | * 10/1995 | ............ H01M/4/24 |
| JP | 7-268514 | * 10/1995 | ............ H01M/4/24 |
| JP | 09053137 | 2/1997 | |

* cited by examiner

*Primary Examiner*—Carol Chaney
*Assistant Examiner*—Dah-Wei D. Yuan
(74) *Attorney, Agent, or Firm*—Birch, Stewart, Kolasch & Birch, LLP

(57) ABSTRACT

The nickel-metal hydride storage battery of this invention includes a nonsintered nickel electrode using, as a positive electrode active material, nickel hydroxide including, as a solid-solution element, at least one element Q selected from the group consisting of Mn, Al, Y, Yb and Co; and a pasted hydrogen-absorbing alloy electrode using, as a negative electrode active material, a hydrogen-absorbing alloy represented by a composition formula, $Ti_aV_bNi_cM_d$, in which a+b+c=100; $15 \leq a \leq 45$; $35 \leq b \leq 75$; $5 \leq c \leq 25$; $0 < d \leq 7$; and M is at least one element selected from the group consisting of Cr, Mn, Mo, Nb, Ta, W, La, Ce, Y, Mm, Co, Fe, Cu, Si, Al, B, Zr and Hf, and the ratio in capacity between the nonsintered nickel electrode and the pasted hydrogen-absorbing alloy electrode is 1:1.1 through 1:1.8. As a result, the invention provides a nickel-metal hydride storage battery having large battery capacity and a long cycle life.

11 Claims, 1 Drawing Sheet

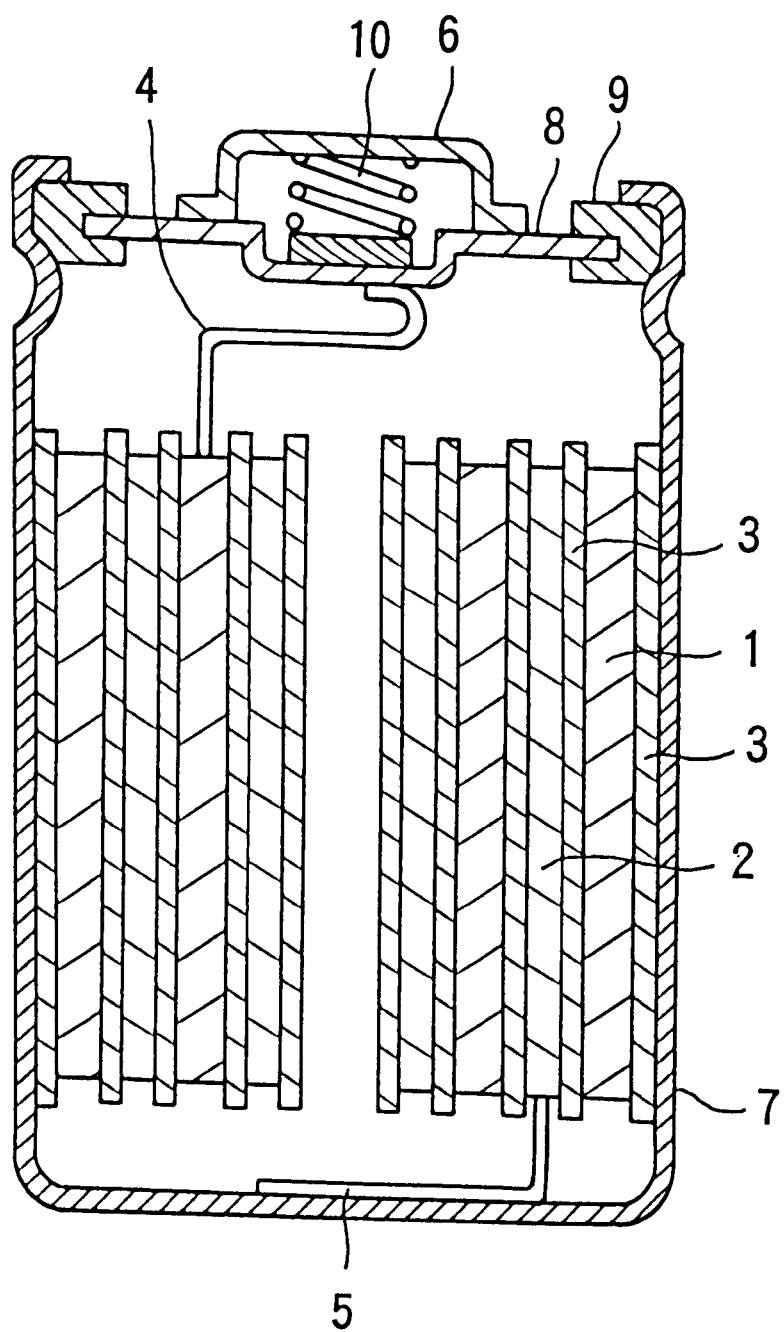
Figure

NICKEL-METAL HYDRIDE STORAGE BATTERY

BACKGROUND OF THE INVENTION

This application claims the Paris convention priority of Japanese Patent Application No. 2000-081535 filed on Mar. 23, 2000, which is incorporated herein by reference.

The present invention relates to a nickel-metal hydride storage battery.

Recently, a nickel-metal hydride storage battery having larger capacity than a conventional nickel-cadmium storage battery is regarded as a promising power supply for portable equipment. A nickel-metal hydride storage battery is designed to have negative electrode capacity larger than positive electrode capacity for the purpose of suppressing degradation through oxidation of the negative electrode active material and increase of the battery internal pressure in overcharge.

In accordance with recent development in performance of portable equipment, a nickel-metal hydride storage battery is required to have larger capacity and a longer service life.

For example, a conventionally proposed nickel-metal hydride storage battery with large capacity uses a positive electrode active material of nickel hydroxide including, as a solid-solution element, at least one element selected from the group consisting of Cd, Ca, Zn, Mg, Fe, Co and Mn in a ratio of 1 through 7 wt %, and a negative electrode active material of a hydrogen-absorbing alloy having a $CaCu_5$-type crystal structure (such as $MmNi_{3.6}Co_{0.7}Mn_{0.4}Al_{0.3}$) (as is disclosed in Japanese Laid-Open Patent Publication No. 5-21064/1993).

In the conventional battery disclosed in Japanese Laid-Open Patent Publication No. 5-21064/1993, since the specific capacity (capacity per unit volume) of the positive electrode active material is large, the battery capacity can be increased at the initial stage of charge-discharge cycles by increasing the density of packing the positive electrode active material. The specific capacity of the negative electrode active material is, however, small, and hence, the ratio of the negative electrode capacity to the positive electrode capacity is extremely small. Accordingly, when charge-discharge cycles are repeated, the negative electrode active material is degraded through oxidation in a small number of cycles, so as to lower the negative electrode capacity. As a result, hydrogen is generated on the negative electrode in overcharge, which causes leakage. In other words, this conventional battery has a problem of a short cycle life. Although this problem can be overcome by increasing the ratio of the negative electrode capacity to the positive electrode capacity, the density of packing the positive electrode active material should be decreased for increasing the ratio. When the density is decreased, the positive electrode capacity is lowered, resulting in lowering the battery capacity.

On the other hand, for example, a conventionally proposed nickel-metal hydride storage battery with a long life uses nickel hydroxide as a positive electrode active material and a hydrogen-absorbing alloy represented by a composition formula, $Ti_xV_yNi_z$ (wherein $15 \leq x \leq 25$; $50 \leq y \leq 90$; $5 \leq z \leq 20$; and $x+y+z=100$) as a negative electrode active material (as is disclosed in Japanese Laid-Open Patent Publication No. 6-228699/1994).

In the conventional battery disclosed in Japanese Laid-Open Patent Publication No. 6-228699/1994, since the specific capacity of the negative electrode active material is larger than that of the aforementioned conventional battery, the ratio of the negative electrode capacity to the positive electrode capacity can be sufficiently increased by decreasing the density of packing the positive electrode active material. Thus, the cycle life of the battery is increased. Since the specific capacity of the positive electrode active material is smaller than that of the aforementioned conventional battery, however, the positive electrode capacity is extremely small. In other words, this conventional battery has a problem of small battery capacity. Although this problem can be overcome by increasing the density of packing the positive electrode active material so as to increase the positive electrode capacity, the density of packing the negative electrode active material should be decreased for this purpose. When the density of packing the negative electrode active material is decreased, the ratio of the negative electrode capacity to the positive electrode capacity is lowered, resulting in shortening the cycle life.

The present invention was devised to overcome the aforementioned antinomic problems, and an object of the invention is providing a nickel-metal hydride storage battery having large battery capacity and a long cycle life.

SUMMARY OF THE INVENTION

The nickel-metal hydride storage battery of this invention (present battery) comprises a nonsintered nickel electrode using, as a positive electrode active material, nickel hydroxide including, as a solid-solution element, at least one element Q selected from the group consisting of Mn, Al, Y, Yb and Co; and a pasted hydrogen-absorbing alloy electrode using, as a negative electrode active material, a hydrogen-absorbing alloy represented by a composition formula, $Ti_aV_bNi_cM_d$, where in $a+b+c=100$; $15 \leq a \leq 45$, $35 \leq b \leq 75$; $5 \leq c \leq 25$; $0 < d \leq 7$; and M is at least one element selected from the group consisting of Cr, Mn, Mo, Nb, Ta, W, La, Ce, Y, Mm, Co, Fe, Cu, Si, Al, B, Zr and Hf, and the capacity ratio between the nonsintered nickel electrode and the pasted hydrogen-absorbing alloy electrode is 1:1.1 through 1:1.8.

As a result, the nickel-metal hydride storage battery of this invention can attain large battery capacity and a long cycle life.

BRIEF DESCRIPTION OF THE DRAWING

A more complete appreciation of the invention and many of the attendant advantages thereof will be readily obtained as the same become better understood by reference to the following detailed description when considered in connection with the accompanying drawing, wherein:

FIGURE is a cross-sectional view of a nickel-metal hydride storage battery fabricated in an embodiment.

DETAILED DESCRIPTION OF THE INVENTION

The present battery includes a nonsintered nickel electrode using, as a positive electrode active material, nickel hydroxide including, as a solid-solution element, at least one element Q selected from the group consisting of Mn, Al, Y, Yb and Co; and a pasted hydrogen-absorbing alloy electrode using, as a negative electrode active material, a hydrogen-absorbing alloy represented by a composition formula, $Ti_aV_bNi_cM_d$, wherein $a+b+c=100$; $15 \leq a \leq 45$, $35 \leq b \leq 75$; $5 \leq c \leq 25$; $0 < d \leq 7$; and M is at least one element selected from the group consisting of Cr, Mn, Mo, Nb, Ta, W, La, Ce, Y, Mm, Co, Fe, Cu, Si, Al, B, Zr and Hf, and the capacity ratio between the nonsintered nickel electrode and the pasted hydrogen-absorbing alloy electrode is 1:1.1 through 1:1.8.

The nickel hydroxide used as a positive electrode active material in this invention includes, as a solid-solution element, at least one element Q selected from the group consisting of Mn, Al, Y, Yb and Co. When the nickel hydroxide thus includes the element Q as a solid-solution element, the amount of protons to be released from and inserted into the positive electrode active material during charge and discharge can be increased, so as to increase the battery capacity. The content of the element Q in the nickel hydroxide is preferably 0.1 through 7 atom % based on the total amount of Ni and the element Q. When the content is smaller than 0.1 atom %, the amount of protons to be released and inserted cannot be sufficiently increased, and when the content exceeds 7 atom %, the density of packing the nickel hydroxide serving as the active material is lowered. In either case, the battery capacity is lowered as a result.

The hydrogen-absorbing alloy used as a negative electrode active material in this invention is represented by the composition formula, $Ti_aV_bNi_cM_d$, wherein a+b+c=100; $15 \leq a \leq 45$; $35 \leq b \leq 75$; $5 \leq c \leq 25$; $0<d \leq 7$; and M is at least one element selected from the group consisting of Cr, Mn, Mo, Nb, Ta, W, La, Ce, Y, Mm (misch metal), Co, Fe, Cu, Si, Al, B, Zr and Hf. A V-phase or a Ti—V phase corresponding to the dominant phase reacts with hydrogen, a Ti—Ni phase corresponding to the second phase improves the current collecting property of the alloy, and the element M such as Cr suppresses the alloy changing into a fine powder through volume change during the charge-discharge cycles. When "a" in the composition formula is smaller than 15, the current collecting property is degraded because the Ti—Ni phase is reduced, and when it exceeds 45, the discharge capacity is lowered because the dominant phase is reduced. When "b" in the composition formula is smaller than 35, the discharge capacity is lowered because the dominant phase is reduced, and when it exceeds 75, the current collecting property is degraded because the Ti—Ni phase is reduced. When "c" in the composition formula is smaller than 5, the current collecting property is degraded because the Ti—Ni phase is reduced, and when it exceeds 25, the discharge capacity is lowered because the dominant phase is reduced. When "d" in the composition formula exceeds 7, the discharge capacity is lowered because the dominant phase is reduced.

The capacity ratio between the positive electrode and the negative electrode of the present battery is 1:1.1 through 1:1.8. When the ratio of the negative electrode capacity to the positive electrode capacity is smaller than 1.1, the positive electrode capacity becomes larger than the negative electrode capacity in a small number of cycles. Therefore, hydrogen is generated on the negative electrode in overcharge, so as to increase the battery internal pressure, which can easily cause leakage. On the other hand, when the ratio of the negative electrode capacity to the positive electrode capacity exceeds 1.8, the electrolyte cannot sufficiently permeate into the inside of the negative electrode because of the increased thickness of the negative electrode, so as to lower negative electrode active material utilization. As a result, the positive electrode capacity becomes larger than the negative electrode capacity in a small number of cycles, and hence, hydrogen is generated on the negative electrode in overcharge, so as to increase the battery internal pressure, which can easily cause leakage.

In the present battery, the specific capacity of both the positive electrode active material and the negative electrode active material is large. Accordingly, even when the ratio of the negative electrode capacity to the positive electrode capacity is increased by lowering the density of packing the positive electrode active material for the purpose of increasing the cycle life, the battery capacity is minimally lowered because of the large specific capacity of the positive electrode active material. On the other hand, even when the positive electrode capacity is increased by increasing the density of packing the positive electrode active material for the purpose of increasing the battery capacity, the cycle life can be avoided from largely shortening as far as the ratio of the negative electrode capacity to the positive electrode capacity is set to 1.1 or more as specified in this invention.

Embodiments

Other features of the invention will become more apparent in the course of the following descriptions of exemplary embodiments which are given for illustration of the invention and not intended to be limiting thereof.

Experiment 1

Embodiment 1

Preparation of Positive Electrode

To 5 liters of an aqueous solution of 167 g of nickel sulfate and 1.86 g of aluminum sulfate dissolved in water, a mixture of a 1 mol/liter sodium hydroxide aqueous solution and a 10 wt % ammonia aqueous solution in a weight ratio of 1:1 was added with stirring, so as to adjust the resultant solution to pH 11, and the solution was stirred for 1 hour for proceeding a reaction. During the reaction, pH 11 was kept by appropriately adding dropwise the mixture every time the pH was slightly lowered. Subsequently, a precipitate was filtered off, washed with water, dried under vacuum, crushed and classified, thereby preparing a nickel hydroxide powder with an average particle size of 10 $\mu$m. The ratio of the amount of Al to the total amount of Ni and Al in the nickel hydroxide obtained by an atomic absorption analysis was 1 atom %.

A paste was prepared by kneading 100 parts by weight of a mixture of the nickel hydroxide powder, a cobalt powder and a cobalt hydroxide powder in a weight ratio of 100:7:5 and 20 parts by weight of a 1 wt % methyl cellulose aqueous solution serving as a binder. The paste was loaded into a porous substrate of foamed nickel (with porosity of 95% and an average pore diameter of 200 $\mu$m), and the resultant was dried and pressed into a nonsintered nickel electrode with a length of 70 mm, a width of 40 mm and a thickness of 0.70 mm. A nonsintered nickel electrode prepared in every embodiment and comparative example described below had the same dimension as that of this nonsintered nickel electrode.

Preparation of Negative Electrode

Melted alloy was obtained by thermally melting 7.18 g of Ti (titanium), 14.0 g of V (vanadium), 4.4 g of Ni (nickel) and 1.29 g of Y (yttrium) in an argon atmosphere with a high frequency furnace. The obtained melted alloy was naturally cooled to give an alloy ingot, and the alloy ingot was crushed, thereby preparing a hydrogen-absorbing alloy powder with an average particle size of 30 $\mu$m represented by a composition formula, $Ti_{30}V_{55}Ni_{15}Y_3$.

A paste was prepared by kneading 90 parts by weight of the hydrogen-absorbing alloy powder and 10 parts by weight of a 0.5 wt % poly(ethylene oxide) aqueous solution serving as a binder. The paste was applied on a punching metal and the resultant was dried, thereby preparing a pasted hydrogen-absorbing alloy electrode with a length of 85 mm, a width of 40 mm and a thickness of 0.35 mm.

Fabrication of Nickel-metal Hydride Storage Battery

A nickel-metal hydride storage battery (present battery) A1 in an AA size having a capacity ratio between the positive electrode and the negative electrode of 1:1.5 was fabricated by using the positive electrode, the negative electrode, a polyamide nonwoven fabric (serving as a separator), an alkaline electrolyte, a metallic negative electrode can, a metallic sealing cover and the like. As the alkaline electrolyte, 2.5 g of a 30 wt % potassium hydroxide aqueous solution was used.

Figure is a schematic cross-sectional view of the nickel-metal hydride storage battery A1, which includes a positive electrode 1, a negative electrode 2, a separator 3, a positive electrode lead 4, a negative electrode lead 5, a positive electrode external terminal 6, a negative electrode can 7, a sealing cover 8, an insulating packing 9, a coil spring 10 and the like.

The positive electrode 1 and the negative electrode 2 spirally wound with the separator 3 sandwiched therebetween are housed in the negative electrode can 7. The positive electrode 1 is connected to the sealing cover 8 through the positive electrode lead 4, and the negative electrode 2 is connected to the negative electrode can 7 through the negative electrode lead 5. The insulating packing 9 is provided between the negative electrode can 7 and the sealing cover 8 so as to seal the battery. The coil spring 10 is provided between the positive electrode external terminal 6 and the sealing cover 8, so that it can be compressed for releasing an internal gas to the outside of the battery when the internal pressure increases to 18 atm.

Embodiments 2 through 6

Nickel-metal hydride storage batteries A2 through A6 (present batteries) were fabricated in the same manner as in Embodiment 1 except that 1.63 g of manganese sulfate, 2.51 g of yttrium sulfate, 3.42 g of ytterbium sulfate, 1.67 g of cobalt sulfate or a mixture of 0.93 g of aluminum sulfate and 0.84 g of cobalt sulfate was used instead of 1.86 g of aluminum sulfate in the preparation of the positive electrode. The ratio (atom %) of the amount of each element Q to the total amount of Ni and the element Q in the nickel hydroxide used as the positive electrode active material was obtained by emission spectroscopy (ICP) (whereas by the atomic absorption analysis with respect to Al). The ratio of Mn was 1 atom % (in the battery A2), the ratio of Y was 1 atom % (in the battery A3), the ratio of Yb was 1 atom % (in the battery A4), the ratio of Co was 1 atom % (in the battery A5) and the ratios of Al and Co were respectively 0.5 atom % and 0.5 atom % (in the battery A6).

Embodiments 7 through 24

Nickel-metal hydride storage batteries A7 through A24 were fabricated in the same manner as in Embodiment 1 except that each element M in the amount listed in Table 1 below was used instead of 1.29 g of Y (yttrium) in the preparation of the negative electrode.

Embodiments 25 and 26

A nickel-metal hydride storage battery A25 (present battery) having a capacity ratio between the positive electrode and the negative electrode of 1:1.1 and a nickel-metal hydride storage battery A26 having a capacity ratio of 1:1.8 were fabricated in the same manner as in Embodiment 1 except that the thicknesses of the negative electrodes were set to 0.26 mm and 0.42 mm, respectively in the preparation of the negative electrodes.

Comparative Example 1

A nickel-metal hydride storage battery X1 (comparative battery) having a capacity ratio between the positive electrode and the negative electrode of 1:1.05 was fabricated in the same manner as in Embodiment 1 except that the thickness of the negative electrode was set to 0.245 mm in the preparation of the negative electrode.

Comparative Example 2

A nickel-metal hydride storage battery X2 (comparative battery) having a capacity ratio between the positive electrode and the negative electrode of 1:2.0 was fabricated in the same manner as in Embodiment 1 except that the thickness of the negative electrode was set to 0.47 mm in the preparation of the negative electrode.

Comparative Example 3

A nickel-metal hydride storage battery X3 (comparative battery) was fabricated in the same manner as in Embodiment 1 except that nickel hydroxide including, as solid-solution elements, 3.7 wt % of zinc and 0.5 wt % of cobalt was used as the positive electrode active material, that a hydrogen-absorbing alloy having a $CaCu_5$-type crystal structure represented by a composition formula, $MmNi_{3.6}Co_{0.7}Mn_{0.4}Al_{0.3}$, was used as the negative electrode active material and that the capacity ratio between the positive electrode and the negative electrode was set to 1:1.05.

Comparative Example 4

A nickel-metal hydride storage battery X4 (comparative battery) was fabricated in the same manner as in Embodiment 1 except that nickel hydroxide was used as the positive electrode active material, that a hydrogen-absorbing alloy represented by a composition formula, $T_{21.9}V_{65.8}Ni_{12.3}$, was used as the negative electrode active material and that the capacity ratio between the positive electrode and the negative electrode was set to 1:2.2.

TABLE 1

| Battery | Element M | Amount (g) |
|---------|-----------|------------|
| A7      | Cr        | 1.51       |
| A8      | Mn        | 1.59       |
| A9      | Mo        | 2.78       |
| A10     | Nb        | 2.69       |
| A11     | Ta        | 5.24       |
| A12     | W         | 5.33       |
| A13     | La        | 4.02       |
| A14     | Ce        | 4.06       |
| A15     | Mm        | 4.06       |
| A16     | Co        | 1.71       |
| A17     | Fe        | 1.62       |
| A18     | Cu        | 1.84       |
| A19     | Si        | 0.81       |
| A20     | Al        | 0.78       |
| A21     | B         | 0.31       |
| A22     | Zr        | 2.64       |
| A23     | Hf        | 5.17       |
| A24     | Y         | 1.29       |
|         | Cr        | 0.76       |

Measurement of Discharge Capacity and Cycle Life

Each of the batteries was subjected to a charge-discharge cycle test in each cycle of which the battery was charged at a rate of 0.1 C by 160% at 25° C. and discharged at a rate of 1 C to 1.0 V at 25° C., thereby obtaining discharge capacity at the 5th cycle and the cycle life. The cycle life was obtained as a number of cycles run until the discharge capacity was lowered to 80% of the discharge capacity at the 5th cycle. The results are shown in Table 2. Each discharge capacity at the 5th cycle and cycle life listed in Table 2 is shown as a relative index obtained by assuming the discharge capacity at the 5th cycle or the cycle life of the nickel-metal hydride storage battery A1 as 100.

Experiment 2

The relationship between the composition of a hydrogen-absorbing alloy used as the negative electrode active material and the discharge capacity and the cycle life was examined.

Nickel-metal hydride storage batteries B1 through B14 were fabricated in the same manner as in Embodiment 1 except that Ti, V, Ni and Y were used in the amounts as listed in Table 3 in the preparation of the negative electrodes. The batteries B2, B3, B6, B7, B10, B11 and B13 are present

TABLE 2

| Battery | Element Q (atom %) | Negative electrode active material | Capacity ratio | Discharge capacity | Cycle life |
|---|---|---|---|---|---|
| A1 | Al (1) | $Ti_{30}V_{55}Ni_{15}Y_3$ | 1.5 | 100 | 100 |
| A2 | Mn (1) | $Ti_{30}V_{55}Ni_{15}Y_3$ | 1.5 | 99 | 100 |
| A3 | Y (1) | $Ti_{30}V_{55}Ni_{15}Y_3$ | 1.5 | 98 | 99 |
| A4 | Yb (1) | $Ti_{30}V_{55}Ni_{15}Y_3$ | 1.5 | 98 | 99 |
| A5 | Co (1) | $Ti_{30}V_{55}Ni_{15}Y_3$ | 1.5 | 99 | 99 |
| A6 | Al (0.5) Co (0.5) | $Ti_{30}V_{55}Ni_{15}Y_3$ | 1.5 | 102 | 100 |
| A7 | Al (1) | $Ti_{30}V_{55}Ni_{15}Cr_3$ | 1.5 | 100 | 99 |
| A8 | Al (1) | $Ti_{30}V_{55}Ni_{15}Mn_3$ | 1.5 | 100 | 99 |
| A9 | Al (1) | $Ti_{30}V_{55}Ni_{15}Mo_3$ | 1.5 | 100 | 98 |
| A10 | Al (1) | $Ti_{30}V_{55}Ni_{15}Nb_3$ | 1.5 | 100 | 98 |
| A11 | Al (1) | $Ti_{30}V_{55}Ni_{15}Ta_3$ | 1.5 | 100 | 97 |
| A12 | Al (1) | $Ti_{30}V_{55}Ni_{15}W_3$ | 1.5 | 100 | 97 |
| A13 | Al (1) | $Ti_{30}V_{55}Ni_{15}La_3$ | 1.5 | 100 | 98 |
| A14 | Al (1) | $Ti_{30}V_{55}Ni_{15}Ce_3$ | 1.5 | 100 | 96 |
| A15 | Al (1) | $Ti_{30}V_{55}Ni_{15}Mm_3$ | 1.5 | 100 | 96 |
| A16 | Al (1) | $Ti_{30}V_{55}Ni_{15}Co_3$ | 1.5 | 100 | 99 |
| A17 | Al (1) | $Ti_{30}V_{55}Ni_{15}Fe_3$ | 1.5 | 100 | 95 |
| A18 | Al (1) | $Ti_{30}V_{55}Ni_{15}Cu_3$ | 1.5 | 100 | 97 |
| A19 | Al (1) | $Ti_{30}V_{55}Ni_{15}Si_3$ | 1.5 | 100 | 95 |
| A20 | Al (1) | $Ti_{30}V_{55}Ni_{15}Al_3$ | 1.5 | 100 | 98 |
| A21 | Al (1) | $Ti_{30}V_{55}Ni_{15}B_3$ | 1.5 | 100 | 96 |
| A22 | Al (1) | $Ti_{30}V_{55}Ni_{15}Zr_3$ | 1.5 | 100 | 97 |
| A23 | Al (1) | $Ti_{30}V_{55}Ni_{15}Hf_3$ | 1.5 | 100 | 96 |
| A24 | Al (1) | $Ti_{30}V_{55}Ni_{15}Y_{1.5}Cr_{1.5}$ | 1.5 | 100 | 102 |
| A25 | Al (1) | $Ti_{30}V_{55}Ni_{15}Y_3$ | 1.1 | 100 | 93 |
| A26 | Al (1) | $Ti_{30}V_{55}Ni_{15}Y_3$ | 1.8 | 100 | 99 |
| X1 | Al (1) | $Ti_{30}V_{55}Ni_{15}Y_3$ | 1.05 | 100 | 75 (leaked) |
| X2 | Al (1) | $Ti_{30}V_{55}Ni_{15}Y_3$ | 2 | 95 | 85 (leaked) |
| X3 | Zn: 3.7 wt % Co: 0.5 wt % | $MmNi_{3.6}Co_{0.7}Mn_{0.4}Al_{0.3}$ | 1.05 | 92 | 70 (leaked) |
| X4 | — | $Ti_{21.9}V_{65.5}Ni_{12.3}$ | 2.2 | 70 | 95 |

As is shown in Table 2, the discharge capacity at the 5th cycle is larger and the cycle life is longer in the present batteries than in the comparative batteries. In the comparative battery X1, leakage was caused at the 75th cycle because the capacity ratio of the negative electrode to the positive electrode was too large. In the comparative battery X2, leakage was caused at the 85th cycle because the electrolyte did not sufficiently permeate into the inside of the negative electrode and hence, the active material utilization was lowered, and as a result, the positive electrode capacity became larger than the negative electrode capacity in a small number of cycles. In the comparative battery X3, leakage was caused in the 70th cycle because the capacity ratio of the negative electrode to the positive electrode was so small that the negative electrode active material was degraded through oxidation so as to lower the negative electrode capacity, and as a result, hydrogen was generated on the negative electrode in overcharge. In the comparative battery X4, the discharge capacity was small because the amount of protons to be released from and inserted into the positive electrode active material was small.

batteries, and the other batteries are comparative batteries. Each battery was subjected to the charge-discharge cycle test under the same conditions as in Experiment 1, so as to obtain the discharge capacity at the 5th cycle and the cycle life. The results are shown in Table 4. The discharge capacity at the 5th cycle and the cycle life of the nickel-metal hydride storage battery A1 listed in Table 2 are also shown in Table 4. Each discharge capacity at the 5th cycle and cycle life listed in Table 4 is shown as a relative index obtained by assuming the discharge capacity at the 5th cycle or the cycle life of the nickel-metal hydride storage battery A1 as 100.

TABLE 3

| Battery | Ti (g) | V (g) | Ni (g) | Y (g) |
|---|---|---|---|---|
| B1 | 2.40 | 17.8 | 5.81 | 1.29 |
| B2 | 3.59 | 17.8 | 4.4 | 1.29 |
| B3 | 10.77 | 10.19 | 4.4 | 1.29 |
| B4 | 11.98 | 10.19 | 2.93 | 1.29 |
| B5 | 10.77 | 8.15 | 6.75 | 1.29 |
| B6 | 10.77 | 8.92 | 5.87 | 1.29 |
| B7 | 3.59 | 19.1 | 2.93 | 1.29 |
| B8 | 3.59 | 19.87 | 2.05 | 1.29 |

TABLE 3-continued

| Battery | Ti (g) | V (g) | Ni (g) | Y (g) |
|---|---|---|---|---|
| B9 | 6.47 | 17.8 | 0.88 | 1.29 |
| B10 | 5.99 | 17.8 | 1.47 | 1.29 |
| B11 | 4.79 | 14.0 | 7.34 | 1.29 |
| B12 | 4.79 | 12.7 | 8.81 | 1.29 |
| B13 | 7.19 | 14.0 | 4.4 | 2.91 |
| B14 | 7.19 | 14.0 | 4.4 | 3.67 |

TABLE 4

| Battery | Negative electrode active material | Discharge capacity | Cycle life |
|---|---|---|---|
| B1 | $Ti_{10}V_{70}Ni_{20}Y_3$ | 100 | 80 (leaked) |
| B2 | $Ti_{15}V_{70}Ni_{15}Y_3$ | 100 | 94 |
| B3 | $Ti_{45}V_{40}Ni_{15}Y_3$ | 100 | 96 |
| B4 | $Ti_{50}V_{40}Ni_{10}Y_3$ | 100 | 78 (leaked) |
| B5 | $Ti_{45}V_{32}Ni_{23}Y_3$ | 100 | 78 (leaked) |
| B6 | $Ti_{45}V_{35}Ni_{20}Y_3$ | 100 | 93 |
| B7 | $Ti_{15}V_{75}Ni_{10}Y_3$ | 100 | 97 |
| B8 | $Ti_{15}V_{78}Ni_{7}Y_3$ | 100 | 77 (leaked) |
| B9 | $Ti_{27}V_{70}Ni_{3}Y_3$ | 100 | 77 (leaked) |
| B10 | $Ti_{25}V_{70}Ni_{5}Y_3$ | 100 | 96 |
| B11 | $Ti_{20}V_{55}Ni_{25}Y_3$ | 100 | 98 |
| B12 | $Ti_{20}V_{50}Ni_{30}Y_3$ | 100 | 75 (leaked) |
| B13 | $Ti_{30}V_{55}Ni_{15}Y_7$ | 100 | 99 |
| B14 | $Ti_{30}V_{55}Ni_{15}Y_9$ | 100 | 82 (leaked) |
| A1 | $Ti_{30}V_{55}Ni_{15}Y_3$ | 100 | 100 |

In the nickel-metal hydride storage batteries B1, B4, B5, B8, B9, B12 and B14, leakage was caused in a small number of cycles because the negative electrode capacity was so small that the capacity ratio of the negative electrode to the positive electrode could not be sufficiently large. It is understood from Table 4 that, in order to obtain a battery with a long cycle life, it is necessary to use a hydrogen-absorbing alloy represented by a composition formula, $Ti_aV_bNi_cM_d$, where in a+b+c=100, $15 \leq a \leq 45$, $35 \leq b \leq 75$, $5 \leq c \leq 25$ and $0 < d \leq 7$.

Experiment 3

The relationship between the content of an element Q included in the nickel hydroxide used as the positive electrode active material and the discharge capacity and the cycle life was examined.

Nickel-metal hydride storage batteries C1 through C4 were fabricated in the same manner as in Embodiment 1 except that 0.09 g, 0.18 g, 13.9 g or 20.5 g of aluminum sulfate was used instead of 1.86 g of aluminum sulfate in the preparation of the positive electrode. The ratios of the amounts of Al to the total amounts of Ni and Al in the respective nickel hydroxides obtained by the atomic absorption analysis were 0.05 atom %, 0.1 atom %, 7 atom % and 10 atom %, respectively. Each battery was subjected to the charge-discharge cycle test under the same conditions as in Experiment 1, so as to obtain the discharge capacity at the 5th cycle and the cycle life. The results are shown in Table 5. The discharge capacity at the 5th cycle and the cycle life of the nickel-metal hydride storage battery A1 listed in Table 2 are also shown in Table 5. Each discharge capacity at the 5th cycle and cycle life listed in Table 5 is shown as a relative index obtained by assuming the discharge capacity at the 5th cycle or the cycle life of the nickel-metal hydride storage battery A1 as 100.

TABLE 5

| Battery | Content of element Q (atom %) | Discharge capacity | Cycle life |
|---|---|---|---|
| C1 | 0.05 | 80 | 98 |
| C2 | 0.1 | 95 | 99 |
| A1 | 1 | 100 | 100 |
| C3 | 7 | 96 | 99 |
| C4 | 10 | 86 | 100 |

In the nickel-metal hydride storage battery C1, the discharge capacity was small because the amount of protons to be released from and inserted into the positive electrode active material was small. In the nickel-metal hydride storage battery C4, the discharge capacity was small because the density of packing the nickel hydroxide used as the active material was low. It is understood from Table 5 that the content of Al in the nickel hydroxide is preferably 0.1 through 7 atom %. It is also confirmed that the content is preferably 0.1 through 7 atom % with respect to each of the other elements Q.

Obviously, numerous modifications and variations of the present invention are possible in light of the above teachings. It is therefore to be understood that within the scope of the appended claims the invention may be practiced otherwise than as specifically described herein.

What is claimed is:

1. A nickel-metal hydride storage battery comprising:
   a nonsintered nickel electrode using, as a positive electrode active material, nickel hydroxide including, as a solid-solution element, at least one element Q selected from the group consisting of Mn, Al, Y, Yb and Co; and
   a pasted hydrogen-absorbing alloy electrode using, as a negative electrode active material, a hydrogen-absorbing alloy represented by a composition formula, $Ti_aV_bNi_cM_d$, in which a+b+c=100; $15 \leq a \leq 45$; $35 \leq b \leq 75$; $5 \leq c \leq 25$; $0 < d \leq 7$; and M is at least one element selected from the group consisting of Mo, W, La, Ce, Y, Mm, Si, Al, and B,
   a ratio in capacity between the nonsintered nickel electrode and the pasted hydrogen-absorbing alloy electrode being 1:1.1 through 1:1.8.

2. The nickel-metal hydride storage battery according to claim 1,
   wherein the nickel hydroxide includes the element Q in a ratio of 0.1 through 7 atom % based on a total amount of nickel and the element Q.

3. The nickel-metal hydride storage battery according to claim 1,
   wherein M is Mo.

4. The nickel-metal hydride storage battery according to claim 1,
   wherein M is W.

5. The nickel-metal hydride storage battery according to claim 1,
   wherein M is La.

6. The nickel-metal hydride storage battery according to claim 1,
   wherein M is Ce.

7. The nickel-metal hydride storage battery according to claim 1,
   wherein M is Y.

8. The nickel-metal hydride storage battery according to claim 1,
   wherein M is Mm.

9. The nickel-metal hydride storage battery according to claim 1, wherein M is Si.

10. The nickel-metal hydride storage battery according to claim 1, wherein M is Al.

11. The nickel-metal hydride storage battery according to claim 1, wherein M is B.

* * * * *